INVENTORS
R. E. DOERFER
C. L. HARMS
L. R. BEARD

Oct. 8, 1963

R. E. DOERFER ETAL 3,106,273

TRANSMISSION AND CONTROLS THEREFOR

Filed May 2, 1960

INVENTORS
R. E. DOERFER
C. L. HARMS
L. R. BEARD

FIG. 5

INVENTORS
R. E. DOERFER
C. L. HARMS
L. R. BEARD

Oct. 8, 1963   R. E. DOERFER ETAL   3,106,273
TRANSMISSION AND CONTROLS THEREFOR
Filed May 2, 1960   4 Sheets-Sheet 4

INVENTORS
R. E. DOERFER
C. L. HARMS
L. R. BEARD

United States Patent Office 3,106,273
Patented Oct. 8, 1963

3,106,273
TRANSMISSION AND CONTROLS THEREFOR
Richard E. Doerfer, Clarence L. Harms, and Lawrence R. Beard, Waterloo, Iowa, assignors to Deere & Company, Moline, Ill., a corporation of Delaware
Filed May 2, 1960, Ser. No. 26,283
20 Claims. (Cl. 192—4)

This invention relates to a transmission and more particularly to a transmission adapted for use in a vehicle so as to produce a plurality of forward and reverse speeds.

Still more particularly, the invention relates to improvements in transmissions of the basic type shown in the U.S. patent to Du Shane 2,710,546. In that transmission, an output shaft is capable of being driven selectively at any one of four speeds from a countershaft which in turn is capable of being driven at either of two forward speeds or one reverse speed from the input or driving shaft. Thus, the countershaft is available to double the number of speeds provided by the gear ratios between the countershaft and the output shaft. Stated briefly, that transmission is of the multi-speed dual-range type and, in the patented transmission, the high and low ranges are accomplished by the selective shifting of a synchronized clutch to connect either a low-speed pinion or a high-speed pinion to the input shaft, the pinions being in constant mesh with low-speed and high-speed gears on the countershaft. A second clutch is provided for connecting the input shaft to a reverse pinion which is also in mesh with a gear on the countershaft. Best results are obtained in that transmission with a design in which the high-low and reverse clutches are provided with synchronizers, and relatively good operating efficiency is achieved, particularly since the several speeds provided by the transmission are within the range of those deemed desirable for use, for example, in agricultural tractors and the like.

According to the present invention, the basic transmission system is employed but is modified by the use of a pair of friction clutches and only one shiftable means as compared with the two shiftable means in the patented transmission. The use of friction clutches has several advantages, one of which is that changes in the range function of the transmission may be accomplished without loss of speed or torque, since the friction clutches may be more readily engaged and disengaged than even synchronized toothed clutches. Moreover, the improved transmission provides for the use of two clutches, one of which may be used in the range change between high and low ranges and also in the range change between forward and reverse, thus eliminating one major component normally represented by a third friction clutch. This feature is achieved by the provision of a single shiftable means, such as a toothed clutch, between the low and reverse pinions for connecting these pinions selectively to the input shaft.

In addition to the foregoing objects, other objects of the invention reside in improved control means for the transmission, particularly control means of the hydraulic type; improved coordination of the range and speed control means, especially in connection with the coordination of the two friction clutches with the shiftable collar or its equivalent; the provision of an improved transmission brake which operates to control two shafts simultaneously; and the coordination of a control valve or its equivalent for controlling the transmission as to speeds and ranges, in coordination with a second valve which may be utilized by the operator as an auxiliary control of the clutches without affecting the range or change positions in the transmission.

The foregoing and other important objects and desirable features inherent in and encompassed by the invention will become apparent as the preferred embodiment thereof is disclosed in detail in the ensuing description and accompanying sheets of drawings, the several figures of which are described below.

Figure 5:
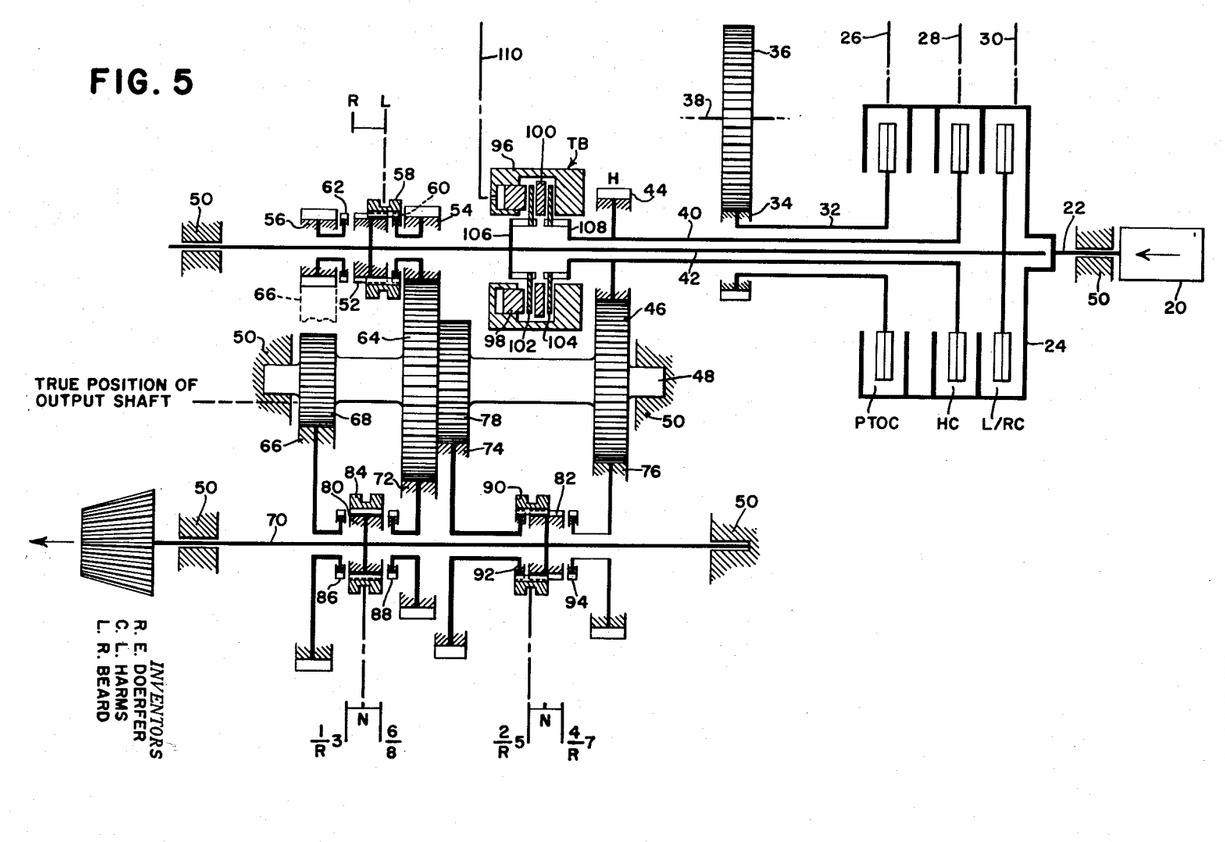
FIG. 5 is a schematic view, partly in section, of the basic transmission to which the controls are applied.

Reference will be had first to FIG. 5 for a disclosure of the transmission and its major components.

In that figure, the numeral 20 represents any suitable power source, such as an internal combustion engine, which drives an input shaft 22 which is fixed to a clutch housing 24 with which are individually associated the clutch plates of three friction clutches PTOC, HC and L/RC. These clutches are preferably of the hydraulically operated type to which fluid is supplied selectively via lines 26, 28 and 30. As will be understood by those versed in the art, each clutch is engaged by supplying fluid under pressure to a piston (not shown) when engages the selected clutch plate with the clutch housing 24.

In the present illustration, the plate for the clutch PTOC is connected to a tubular shaft 32 which has keyed thereto a pinion 34 in constant mesh with a power take-off shaft output gear 36 which is in turn keyed to a power take-off shaft 38. As is conventional, the shaft 38 may extend rearwardly and/or forwardly for connection to implements and machinery associated with the vehicle. The power take-off means is shown here merely as part of the basic environment and as such does not affect the inventive characteristics of the transmission.

The high-range clutch HC has its plate fixed in any suitable fashion to a tubular first driven shaft 40 within which is coaxially loosely received a second driven shaft 42. The second shaft is keyed or otherwise suitably connected to the plate for the low-reverse clutch L/RC. Thus, the shafts 32, 40 and 42 are concentrically arranged and have their common axis coaxial with the axis of the input shaft 22, which is a feature in a specific sense but in the broader aspects of the invention the shafts could be otherwise arranged as long as the desirable results to be outlined are achieved.

The first driven or high-speed shaft 40 has keyed thereto adjacent to its rear end—its end remote from the input shaft 22—a high-speed pinion 44 which is in constant mesh with a high-speed gear 46 fast on a third driven shaft or countershaft 48 which parallels the axis of the shafts 40 and 42. The countershaft is suitably journaled at opposite ends in housing portions of the transmission casing, which is not shown completely; however, for purposes of identification, the housing portions are represented in each case by the numeral 50.

The second driven shaft or low-reverse shaft 42 extends rearwardly beyond the high-speed pinion 44 and is journaled in another housing portion 50, and has intermediate its ends a drive member 52 which is externally splined or toothed as shown. The drive member 52 is located axially intermediate a low-speed pinion 54 and a reverse pinion 56. These two pinions are independently journaled so as to be rotatable relative to each other and relative to the drive member 52. The arrangement of the three components is coaxial so that a clutch collar 58 may be selectively shifted back and forth between two positions as indicated by the letters "R" and "L." The collar 58 is conventionally internally splined for selective engagement with toothed clutch parts 60 and 62 respectively on the pinions 54 and 56. That is to say, when the clutch collar 58 is shifted to the right as shown in FIG. 5, it will interconnect the drive member 52 and low-speed pinion 54 for rotation together. Since the pinion 54 is in constant mesh with a low-speed gear 64 on the countershaft 48, the driven shaft 42 and countershaft 48 will be drivingly interconnected at the speed ratio determined by the ratio between the pinion 54 and gear 64. The countershaft will be driven when the low-reverse clutch L/RC is engaged, during which time, of course, the high-speed clutch HC will be disengaged. When the high-speed clutch HC is engaged and the low-reverse clutch L/RC is disengaged, the countershaft 48 will be driven via the pinion 44 and countershaft gear 46 and at the speed ratio determined by the gear ratio between the two.

When the clutch collar 58 is shifted to the left, it drivingly interconnects the drive member 52 and reverse pinion 56 via the clutch teeth 62. The reverse pinion 56 is in constant mesh with a reverse idler 66 which in turn is in constant mesh with a gear 68 on the countershaft 48. In order to clarify the present disclosure, the relationship among the two top shafts 40 and 42, the countershaft 48 and an output shaft 70 has been altered so that the output shaft is out of its true position. However, the true position of the output shaft is designated on the drawings, from which it will be seen that the gear 66 (a portion of which is also shown in dotted lines) establishes the relationship indicated between the reverse pinion 56 and the countershaft gear 68. By this arrangement, the gear 66 can be journaled on the output shaft 70 along with three other output shaft gears 72, 74 and 76. The output shaft gear 72 is in constant mesh with the low-speed countershaft gear 64, and the output shaft gear 76 is in constant mesh with the high-speed countershaft gear 46. The output shaft gear 74 is in constant mesh with a fourth gear 78 on the countershaft. This arrangement, as pointed out in the Du Shane patent noted above, enables compactness in an organization which is capable of producing eight speeds forward and four speeds in reverse.

It will be clear, of course, that the output shaft gears 66, 78, 74 and 76 are independently journaled on the output shaft, which itself is journaled at opposite ends in housing portions represented by the numeral 50, as before. The output shaft 70 has keyed thereto a pair of axially spaced drive members 80 and 82, each of which may be similar to the drive member 52 on the driven shaft 42, described above. The member 80, like the member 52, is externally splined or toothed and axially shiftably carries thereon an internally splined or toothed collar 84 which is selectively axially shiftable from the neutral position shown into engagement with clutch teeth 86 or 88 respectively on the output shaft gears 66 and 72. Similarly, a shiftable collar 90 on the externally splined drive member 82 on the output shaft 70 is selectively axially shiftable between a neutral position and either of two active positions, one of which is shown as represented by engagement between the collar 90 and clutch teeth 92 on the output shaft gear 74, and the other of which effects engagement between the collar 90 and clutch teeth 94 on the countershaft gear 76.

In FIG. 5, the collar 58 of what may be regarded as the low-reverse changeable means is engaged with the clutch teeth 60 on the low-speed pinion 54, and the collar 90 on the output shaft drive member 82 is in engagement with the clutch teeth 92 on the countershaft gear 74. Thus, if the low-reverse clutch L/RC is engaged, the shaft 42 will be driven which will in turn drive the countershaft 48 at the gear ratio established between the pinion 54 and gear 64. Since the countershaft gear 78 is fixed to the countershaft and is in constant mesh with the output shaft gear 74, the gear 74 will be driven at the gear ratio between the gears 78 and 74 and, since the clutch 90 is engaged, the output shaft 70 will rotate at that speed. In this case, that provides second speed forward, which is the lower of two forward speeds available with the clutch 90 in the position shown. The other of the forward speeds is a higher speed—here fifth speed forward—and is achieved by disengaging the clutch L/RC and engaging the high-speed clutch HC. Thereupon, the shaft 40 is driven and this in turn drives the countershaft 48 via the high-speed pinion 44 and high-speed countershaft gear 46, the countershaft now rotating at a ratio higher than that previously effected between the pinion 54 and gear 64. The countershaft gear 78 is still in mesh with the output shaft gear 74 and the collar 90 is still connected. Consequently, the higher of the two forward speeds is obtained. This represents one example of how the number of output shaft speeds may be doubled by selection between the two clutches HC and L/RC.

One reverse speed may be achieved with the output shaft clutch 90 engaged as shown, and this is accomplished by shifting the range collar 58 to the left so that it interconnects the range shaft drive member 52 and reverse pinion 56. This now connects the shaft 42 to the output shaft 70 via the pinion 56, output shaft gear 66, countershaft gear 68, countershaft gear 78 and output shaft gear 74, the clutch 90 still being connected as heretofore. The speed ratio will now, of course, depend upon the gear ratio among the several gears noted, but the rotation of the output shaft will be reversed, because of the interposition of the gear 66. That is to say, in the forward speeds described, the direction of rotation of the countershaft was opposite to that of either of the shafts 40 or 42, and the output shaft was rotated in the same direction as that of the shafts 40 or 42. In the case of reverse speed, the direction of rotation of the output shaft 70 is reversed. Consequently, in each setting of the output shaft clutch 90, three ranges are available; namely, low speed forward, high speed forward and reverse. The same is true with the setting of the clutch 90 to the right of its neutral position, in which case the output shaft drive member 82 will be clutch-connected to the clutch teeth 94 on the output shaft gear 76. In low range, fourth speed forward will be produced; in high range, seventh speed forward will result; also, a relatively high reverse speed may be obtained.

Four more forward speeds and one reverse speed are available by selective shifting of the output shaft clutch collar 84, which will be clear from the schematic illustration and the speed identification shown in the drawing. However, by way of example, it can be said that the clutch collar 84, when shifted to the left, so as to connect the output shaft drive member 80 and output shaft gear 66, is capable of producing first or third speeds forward and the lowest of the three available reverse speeds. In this reverse speed, the output shaft 70 is driven directly from the reverse pinion 56 and output shaft gear 66 whereas in the other reverse speeds, the output shaft gear 66 functions as an idler. Shifting of the collar 84 to the right connects the output shaft drive member 80 to the output shaft gear 72 and consequently is capable of producing sixth and eighth speeds forward. As previously indicated, a fourth reverse speed is available when the collar 58 is shifted to the left to connect the shaft 42 to the pinion 56.

It will be seen from the foregoing that the basic characteristic of the improved transmission is that the two forward ranges and one reverse range may be achieved simply by the utilization of the two clutches HC and L/RC in conjunction with the changeable means represented by the low-reverse shift collar 58. With the shift collar 58 in the low or forward position as shown, high and low ranges may be achieved by selectively alternating engagement of the clutches HC and L/RC. Since friction clutches are inherently capable of synchronized engagement and disengagement, the changes between ranges may be effected without loss of torque. Now, with the range collar 58 to the left of the position shown (in reverse) the same two clutches HC and L/RC are capable of being alternately engaged and disengaged to produce forward and reverse. That is to say, the clutch L/RC doubles as a low forward or as a reverse clutch. In the changes in both ranges—high to low and forward to reverse—quiet and efficient operation is assured without loss of torque, since the changes are effected by friction clutches and without the clashing of gears. The only toothed member involved in the change is the shift collar 58 and its associated toothed clutches 60 and 62, but the change has been effected preliminarily and alternation between the two clutches HC and L/RC occurs subsequently and without requiring changing in the shift collar 58. In those instances in which cost is relatively unimportant, the shift collar 58 and its components could utilize synchronizing means, which could also be employed in the shift collars 84 and 90 on the output shaft. These, however, are refinements to the basic structure illustrated and could be utilized or not, without departing from the spirit of the present invention.

The control mechanism for shifting the output shaft collars 84 and 90 may be of any suitable type, not material here; for example, these collars may be shifted by cam shifting mechanism as shown in the U.S. patent to Du Shane et al., 2,772,652.

Another feature of the invention is the utilization of a transmission brake, designated in its entirety at TB and comprising what may be regarded as a portion 96 of the housing 50, which forms a cylinder containing a ring-like piston 98 for applying pressure to a plurality of brake plates including a central plate 100 sandwiched between other plates 102 and 104, the former being connected to a hub 106 on the shaft 42 and the latter being connected to a hub 108 on the shaft 40. The brake is preferably fluid operated and is supplied by a pressure line 110 which causes the piston 98 to move to the right so as to apply compressive forces to the three plates 100, 102 and 104. The significant advantage of this arrangement is that application of the brake is effected simultaneously on both shafts 40 and 42 and is used primarily in making the change of the shift collar 58 between its low and reverse positions. The brake is of simple design and construction and may be included in the transmission at small additional cost. As will be brought out below, the brake is controlled by control means separate from but useful with the control means for the clutches HC and L/RC and the controls for the output shaft collars 84 and 90.

Figures 6, 7, 8, 9, 10, 11:
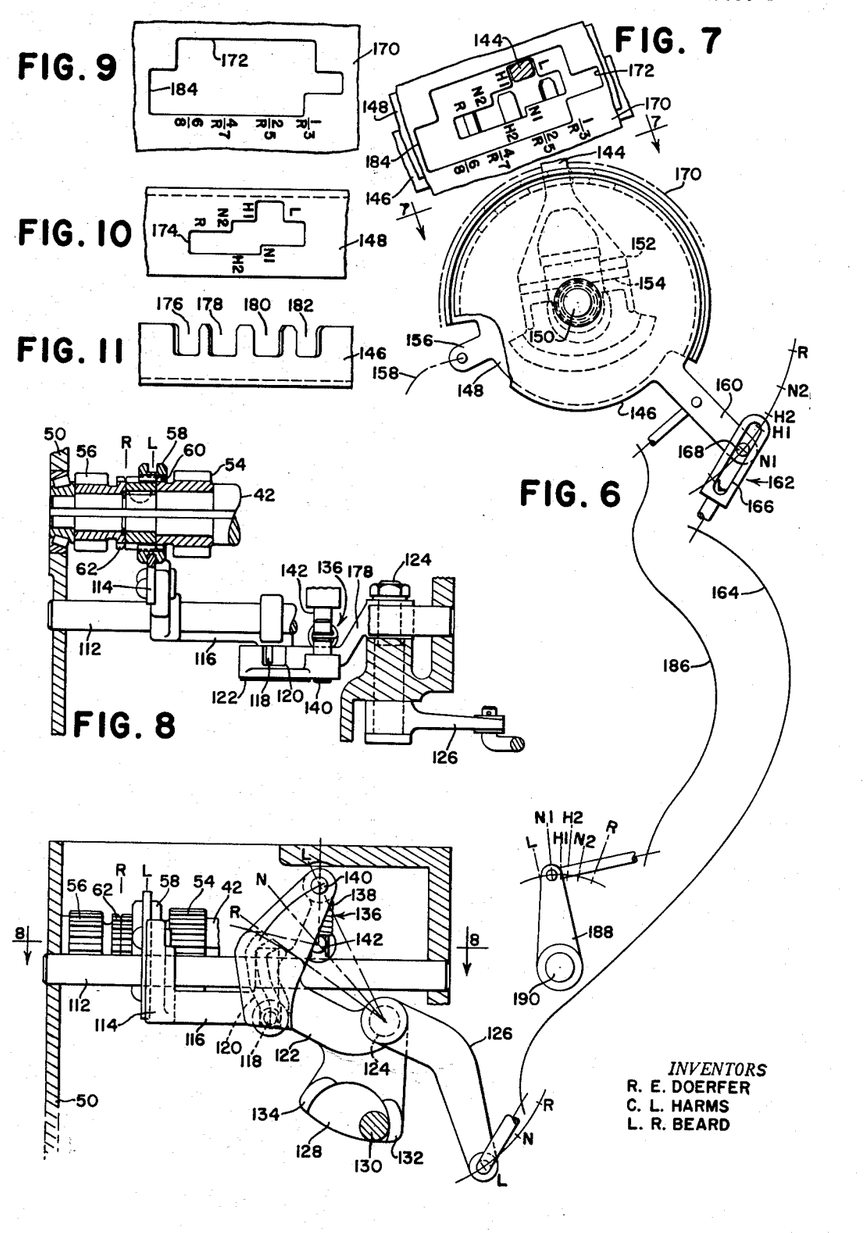
FIG. 6 is a view showing the interconnection between the control mechanism and the low-reverse range-change means.
FIG. 7 is a fragmentary plan as seen generally on the line 7—7 of FIG. 6.
FIG. 8 is a section as seen generally along the line 8—8 in FIG. 6, it being understood of course that the line is staggered to include portions out of the plane of the line indicated.
FIG. 9 is a plan view of a fragment of the panel associated with the control means.
FIG. 10 is a plan of the speed selector.
FIG. 11 is a plan of the range selector.

Part of the mechanism for shifting the range or low-reverse collar 58 is illustrated in FIGS. 6 and 8, wherein it is shown that the transmission housing 50 carries a shift rod 112 parallel to the shaft 42 and on which is slidably mounted a shifter yoke 114 which engages the groove in the collar 58. A portion of the yoke 114 is extended forwardly at 116 and carries a transverse pin or roller 118 which runs in a track 120 of a rockable shifter member 122. The member 122 is keyed to a rockshaft 124 which also has fixed thereto an operating arm 126. A depending portion 128, integral with the shifter 122, cooperates with a stop pin 130, carried by the housing 50, to establish two extreme positions for the shifter. As shown in FIG. 6, the shifter is in its low or "L" position, and the collar 58 engages the teeth 60 on the low-speed pinion 54. When the rockshaft 124 is rocked in a counterclockwise direction, the collar 58 is shifted to the "R" or reverse position because of the design of the cam track 120. In the low position as shown, the pin 130 engages a stop lug 132 at one side of the depending portion 128. When the shifter is rocked to its reverse position, the pin 130 will engage a second stop lug 134 at the opposite side of the depending portion 128.

In the present design, the collar 58 has no actual neutral position; although, it may be regarded as having a neutral position intermediate the "L" and "R" positions. However, the neutral position is never attained, because of the association with the shifter 122 of over-center mechanism indicated in its entirety by the numeral 136. This comprises a spring pack 138 connected at one end at 140 to a boss on the shifter 122 and anchored at its other end at 142 on a pin suitably carried by the housing 50. When the shifter is in its low position, the spring pack 136 acts in compression along a line drawn between the centers of the pins 142 and 140, as represented in FIG. 6 by a broken line; when the shifter is in its reverse position, the spring pack operates along a line below a line drawn from the center of the rockshaft 124 to a point midway between the "R" and "L" positions. In other words, the only time a straight line can be drawn between the centers of the rockshaft 124, pin 140 and pin 142 is when the shifter is midway between the "R" and "L" positions. However, the design is such that the spring pack will snap the shifter to one side or the other of the dead-center position, depending upon the direction in which it is initially urged by forces applied to the arm 126, as by control mechanism to be described later. Of course, the spring pack has sufficient force to accomplish shifting of the collar 58 but in the event that the splines or teeth are not in mesh, the collar 58 will stop but will still be urged toward its intended position by the spring pack, and as soon as the teeth become alined, the spring pack will complete the shift. As will be brought out below, it is preferred that the shift between low and reverse be accomplished by disengagement of both clutches HC and L/RC.

As previously indicated, the speed-selecting shifter collars 84 and 90 on the output shaft, as well as the low-reverse selector collar 58, may be shifted by cam tracks such as that shown at 122 here and as further exemplified in the Du Shane et al. Patent 2,772,652. A control system of that type requires, in the first instance, a manual control lever, and such lever is indicated here at 144 (FIGS. 6 and 7). This control lever is used with speed and range selectors of the character forming the subject matter of U.S. patent to Swenson 2,775,134; although, modified to fit the present situation. In the present case, a range selector 146 and a speed selector 148 are coaxially but independently journaled, as on a transverse rockshaft 150. This rockshaft also serves to mount the lever 144 via a shaft-carried block 152 to which the bifurcated lower end of the lever 144 is connected by a fore-and-aft pivot pin 154. Consequently, the lever 144 may be rocked fore and aft and also may be shifted laterally. The purpose of the lateral shifting is to enable the lever to engage one or the other of the two selectors 146 and 148 and, having engaged one selector, may be rocked fore and aft to change the angular position of that selector. In so doing, it will, in one case, change the position of the shifter 122 and, in the case of the other selector, will selectively change the positions of the speed-change shifters or collars 84 and 90. As shown in FIG. 6, the speed selector 148 has thereon an ear 156 to which a connection may be made to the mechanism for shifting the speed-change collars 84 and 90. Such linkage is represented schematically by the numeral 158. As indicated, the mechanism is shown in the above identified patent to Du Shane et al. 2,772,652. Other mechanism may be utilized and that referred to is merely representative.

The range selector 146 has integral therewith an arm 160 which has a lost-motion connection 162 to a link 164 which is in turn connected to the shifter rockshaft arm 126. The purpose of the lost-motion connection is to enable the range selector to be moved back and forth between one range including low, neutral and high, for forward range changes (high-low) and in another range including forward, neutral and reverse, for forward-reverse changes. Thus, as long as the range selector is moved in one range, the previously selected position of the shifter 122 will be retained, and it is only by transferring the range selector from one range to the other that the position of the shifter 122—and consequently of the low-reverse collar 58—is changed. The lost-motion connection includes a slot 166 in the upper end of the link 164 which loosely receives a pin 168 on the range selector arm 160. In the example shown, the shift collar 58 is in its low or "L" position, and the range selector is in a neutral position intermediate the opposite ends of one range. Since this is the forward range, in which alternate engagement of the clutches HC and L/RC produce high and low forward ranges, the collar 58 must be retained in its "L" position. Opposite ends of the first or forward range are designated respectively by the letters "L" and "H$_1$," with the intervening neutral position designated by the letter "N$_1$." The other range is designated by opposite end positions "R" and "H$_2$," with an intermediate or neutral position "N$_2$." As will be seen, the length of the slot 166 is sufficient to enable the range selector to be rocked through a range of arcuate movement accommodated by the slot without transmitting any shifting forces to the link 164. Consequently, the two clutches HC and L/RC may be alternated in engagement without changing the position of the low-reverse collar 58.

When the transfer is made from the L—H$_1$ range to the H$_2$—R range, the shift collar 58 is changed from its "L" position to its "R" position. This is consistent with the proposition that the same clutches HC and L/RC are used in the forward-forward range as well as in the forward-reverse range. Once the range change is made from L—H$_1$ to H$_2$—R, the shift collar 58 is moved to the "R" position, and opposite angular rocking of the range selector 146 may occur in the H$_2$—R range within the limits of the slot 166 without affecting the position of the shift collar 58. The significant thing is that when the change is made from H$_1$ to H$_2$ or from H$_2$ back to H$_1$, the pin 168 picks up the linkage, because at that time it is at one end or the other of the slot 166 in the upper end of the link 164. The mechanism is so designed that the amount of movement that occurs in the change from H$_1$ to H$_2$ or vice versa is enough to enlist the aid of the spring pack 136; that is to say, the amount of movement is sufficient to move the pin 140 past the dead-center position in the direction in which it is desired to make the shift change. For example, in the transfer from H$_1$ to H$_2$ in FIG. 6, the pin 168 engages the upper end of the slot 166 and exerts a tensional force on the link 164, which rocks the shifter arm 126 and consequently the shifter 122 in a counterclockwise direction, swinging the pin 140 through its arcuate path until it passes just to the left of the dead-center line indicated, after which the spring pack 136 completes the shift as the shifter 122 swings to its final position with the stop lug 134 engaging the pin 130. In the change back from H$_2$ to H$_1$, the shifter 122 is rocked in a clockwise direction and the point 140 passes dead center and the spring pack 136 completes the shift. As previously stated, if the teeth on the associated pinion (54 or 56) are not in alinement with the teeth or splines in the collar 58, the spring pack will bias the collar 58 in the intended direction so that when the teeth or splines become alined, the spring pack 136 completes the shift.

In a typical vehicle installation, the range and speed selectors will be mounted coaxially, as by the rockshaft 150, in conjunction with a panel 170 which is arcuately arranged and which has an opening 172 therein designed to accommodate the shift pattern. The three fragments of the panel 170, speed selector 148 and range selector 146 are shown separately in FIGS. 9, 10 and 11 to facilitate an understanding of FIG. 7.

The speed selector has formed therein an irregular slot 174 and the upper arcuate face of the speed selector, visible through the opening 172 in the panel 70, bears appropriate indicia or markings; namely L, N$_1$, H$_1$; H$_2$, N$_2$ and R. The configuration of the irregular slot 174 is coordinated with these positions so as to guide the movement of the lever 144, as will be clear from below.

The range selector has therein four notches, any one of which is adapted to receive the lever 144 when the lever is rocked in the proper direction; here to the right. When the two selectors and panel are assembled, the notches will respectively register with four basic positions of the lever 144 which correspond with the four range-speed conditions available in the transmission; namely, 1–R–3, 2–R–5, 4–R–7 and 6–8. In the interests of clarify, the notches will be numbered in FIG. 11 from left to right as 176, 178, 180 and 182; but these numerals will not be applied in FIG. 7, since the parts there may be readily oriented from FIGS. 9, 10 and 11.

As shown in the above-identified Swenson patent, the lever 144 must have a position either as shown in FIG. 7 here or completely within one of the notches in the range selector, because interlocking means prevents fore-and-aft rocking of the lever 144 unless it is in either one of these positions, thus guaranteeing against movement of both selectors simultaneously. Now, following the pattern established in FIG. 5, with the low-reverse collar 58 in its "L" position and the output shaft collar 90 in its 2–R–5 position, the transmission is conditioned for forward travel in either second or fifth speed, depending upon which of the clutches HC or L/RC is engaged. With the lever 144 in the notch in the speed selector as shown in FIG. 7, both these clutches are disengaged. However, the lever 144 engaged in the speed selector notch as shown and moved to a position in which it is opposite the notch 180 for the 2–R–5 position means that the speed selector has shifted the collar 90 to the position of FIG. 5. The lever 144 is now moved laterally or to the right (as seen from above and looking forward as in a conventional vehicle) and into the notch 180. At this point the range selector is still in neutral and it remains only to rock the lever 144 forwardly or rearwardly to either the "L" or "H$_1$" position, to select which of the clutches L/RC or HC will be engaged. If the latter, then the higher of the two speeds (second and fifth) will be selected and the vehicle will travel forwardly in fifth speed. As will be clear from FIG. 6, the pin 168 is free to travel in the slot 166 between the "L" and "H$_1$" positions without changing the positon of the collar 58. Consequently, when the vehicle is operating in fifth speed, with the high-range clutch HC engaged, the low-range clutch L/RC is disengaged and no drive is transmitted through the collar 58. Instead, drive is transmitted through the shaft 40 and high-range pinion 44 to the countershaft 48 and thence to the output shaft 70. If the operator wishes to "step down" from fifth to second, he rocks the lever 144 forwardly, still engaged in the notch 180, and thus disengages the clutch HC and engages the low clutch L/RC, in which case the torque is transferred from the shaft 40 to the shaft 42 and the latter drives through the engaged clutch 58 across the member 52 and low-range pinion 54 to the countershaft 48 and thence to the output shaft via the connected collar 90, the position of which of course has not changed.

If the operator wishes to keep the same speed ratio in the gearing between the countershaft and output shaft, as established at 78—74—90 and to proceed to reverse in that ratio (or at the comparable ratio involved, depending upon the pinion and gear sizes in reverse), he moves the lever rearwardly out of the L—$N_1$—$H_1$ range and into the $H_2$—$N_2$—R range. In so doing, he imparts to the range selector 146 sufficient angular movement to cause the pin 168 to pick up the end of the link 164 and consequently to transmit the requisite force to the shifter 122 for effecting a change in the position of the collar 58 from "L" to "R". As previously described, the spring pack 136 is a significant force-applying component in this transistion. With the collar 58 now changed to its "R" position and with the range selector now operating in its second range ($H_2$—$N_2$—R), the same two clutches previously employed—HC and L/RC—are used to change the transmission between fifth speed forward and second speed reverse, this being so because engagement of the clutch HC transmits drive through the high-range pinion 44 and the clutch L/RC when engaged transmits drive through the reverse pinion 56. When the change is made back from the forward-reverse range ($H_2$—$N_2$—R) to the forward-forward range ($H_1$—$N_1$—L) the collar 58 is changed from its "R" position to its "L" position. As has been mentioned briefly above and as will be elaborated below, the transfer from one range to the other is normally or preferably accompanied by application of control components in such manner that both clutches are disengaged and the transmission brake TB is applied, whereby the shift of the collar 58 may be accomplished with little or no gear clashing. Of additional importance is the fact, also mentioned briefly above, that the two clutches HC and L/RC may be alternated quickly and easily and without substantial loss of torque, in which respect the transmission qualifies in its range aspects as being of the full-torque-shift type, here accomplished by the expedient of the two friction clutches and the single changeable means represented by the collar 58 and its related components.

A brief review of the accomplishment of other speed changes in the transmission may be in order, in which respect reference should again be had to FIGS. 6 and 7 in which the control lever 144 is shown in what may be regarded as the central notch in the speed selector. Let it be assumed that the operator desires to utilize first speed forward. In this case, he will move the control lever 144 forwardly, or to the right as seen in FIGS. 6 and 7, which will bring the control lever in lateral register with the notch 182, which represents the 1–R–3 position. The lever 144 is then shifted laterally into the notch 182 and is moved forwardly to rock the range selector 146 in a clockwise direction. This will be represented by travel of the pin from $N_1$ (as shown) to position "L." It will be understood that when the speed selector is moved forwardly to aline the lever 144 with the notch 182, the position "L" marked on the speed selector will of course similarly advance, which will give the operator an indication of the direction in which the lever 144 should be moved. However, details of this type are not material to the present invention and many types of selectors could be employed in accomplishing the broad principles disclosed. The same is true of the arrangement and mounting of the speed and range selectors and the linkages interconnecting the selectors with the transmission. Those components described of course have specific novelty but it is desired to point out that on the broad basis of the results obtained, specifically different mechanisms could be utilized while achieving such results as the utilization of the two friction clutches and one changeable means, the employment of the over-center device 136 and the coordination of the controls by means of the single control lever 144.

Having selected first speed forward, the operator may now achieve third speed forward simply by rocking the control lever 144, still in the notch 182, rearwardly to the "$H_1$" position, which will disengage the low clutch L/RC and engage the high clutch HC. When the selection has been made as to the 1–R–3 position, the force transmitting linkage has, of course, returned the collar 90 to its neutral position and has picked up the collar 84 and shifted it to the left (FIG. 5) to connect the output shaft drive member 80 to the teeth 86 on the output shaft gear 88, thus establishing the lowest of the forward speed ratios. Again, as in the case of the difference between second and fifth, the difference between first and third is the difference between which of the two clutches HC and L/RC is engaged. The lowest speed in reverse may of course be achieved by moving the lever 144 so as to transfer the range selector from the forward-forward range (L—$N_1$—$H_1$) to the forward-reverse range ($H_2$—$N_2$—R) which will again bring in the change in the shifter 122 to shift the collar 58 from "L" to "R."

The same results are obtainable in the 4–R–7 positions; that is, the lower of the two speeds may be accomplished by preliminarily setting the collar 58 in the low position and then alternating the two clutches HC and L/RC to "step up" and to "step down" between the higher and lower of the two forward speeds. A transfer from the forward-forward range to the forward-reverse range via the selector 146 brings the reverse conditions into play, with the exception of the 6—8 condition, in which reverse is blocked out. This is accomplished by so designing the opening 172 in the panel 170 as to prevent movement of the lever 144 to the reverse position when it is in the 6—8 notch 176 in the range selector. This will be clear from FIG. 7 when it is noted that when the lever 144, in the notch in the speed selector, is moved as far to the rear as possible to bring it in alinement with 6—8 notch in the range selector, after which the lever 144 is movable rearwardly only to the extent permitted by the rear extremity 184 of the opening 172. In instances in which the highest (fourth) of the reverse speeds is desirable, it is a simple expedient to modify the control panel to provide for elongation of the opening 172 in the area of the portion 184 so as to permit the additional movement required. Here again, this is a detail that could be varied to suit individual desires.

The description thus far has proceeded on the basis that the clutches HC and L/RC are somehow controlled by changes in position of the range selector 146. Although there are several ways in which this could be accomplished, when applying the broad principles of the invention to commercial practice, the arrangement disclosed, and about to be described, possesses significant novelty in the coordination of the transmission, particularly in the utilization of the two ranges L—$N_1$—$H_1$ and $H_2$—$N_2$—R.

In the particular embodiment shown, the system utilizes controlling and directional forces from the range selector 146 to selectively position a hydraulic valve, designated as a control valve in FIGS. 1–4. The illustration in these figures is schematic and symbolic, but will be readily understood by those versed in the art, and it is deemed unnecessary to employ conventional illustrations of housing, passages, valve spools and the like. The mechanical connection between the manual control station, represented by the lever 144, and the control valve, includes the range selector 146 and a linkage connection 186 to a lever 188 which is mounted on a rockshaft 190 which is in turn connected to the control valve. As shown in FIG. 6, the lever 188 is illustrated as being movable through the six positions in the two ranges previously described; namely, L, $N_1$, $H_1$, $H_2$, $N_2$ and R. These positions correspond in number to those represented on the arc through which the pin 168 moves. Because of the mechanical connections involved, the angular distances in the ranges of movement of the pin 168 do not exactly correspond to those in the angular movement of the lever 188. However, this again is a minor detail which depends upon the mechanical expedients employed. In FIGS. 1–4, the illustrations, being schematic, employ appropriate legends, and thus make reference numerals largely unnecessary. As will be seen, the control valve, designated in its entirety at CV, is a six-position valve, employing the six positions of the two range selector ranges previously described (L, $N_1$, $H_1$, $H_2$, $N_2$ and R). A mechanical connection to a rectangle identified by the numeral 188 represents the mechanical connection of the valve CV to the shaft-mounted lever 188, it being understood of course that other connections are necessary, all of which are illustrated in FIG. 6.

In addition to the control valve CV, the hydraulic circuit employs a pump, an accumulator and what may be regarded as a selector valve SV. The pump and accumulator are appropriately designated and need no reference characters. The selector valve SV may be connected to a clutch pedal, for example, here schematically represented by the rectangle labeled "MAN," in conjunction with which a spring 192 is employed to bias the selector valve to the first of four positions which it is capable of assuming. These positions are labeled simply 1, 2, 3, and 4. In the circumstances assumed; that is, where a clutch pedal is employed, the No. 1 position of the selector valve SV will be that occupied when the clutch pedal is not depressed.

The control valve CV regulates the transmission of fluid pressure through the clutch lines 28 and 30, previously described as leading respectively to the hydraulically operated clutches HC and L/RC. In a system employing the hydraulic clutch PTOC, a separate control valve would be provided. Such separate valve is not shown here, since it plays no important part in the present invention. The selector valve controls, among other things, the line 110 to the transmission brake TB, described above in connection with the mechanical components of the basic transmission.

When the system is operating in the condition in which the control valve is in its $N_1$ position and the selector valve is in its No. 1 position, the pump discharge line 194 discharges across the selector valve SV to a pressure line 196 to the control valve and returns via a passage 198 therein to an accumulator line 200 which leads back across the selector valve to the accumulator. Associated with the accumulator is a valve 202 which occupies the position shown in FIG. 1 when the accumulator is not charged. The rectangle labeled "HYD" represents hydraulic means for shifting the valve 202 to the position of FIGS. 2, 3 and 4 when the accumulator is charged. Also, with the control valve CV in the $N_1$ position, both lines 28 and 30 from the clutches HC and L/RC respectively are connected to a reservoir line 204. Consequently both clutches are disengaged and the transmission is in neutral, even though the shift collar 58 is in its "L" position and the speed shift collar 90 is in its 2–R–5 position. That is to say, it will take engagement of one or the other of the clutches HC or L/RC to produce forward travel of the vehicle.

Figure 3:
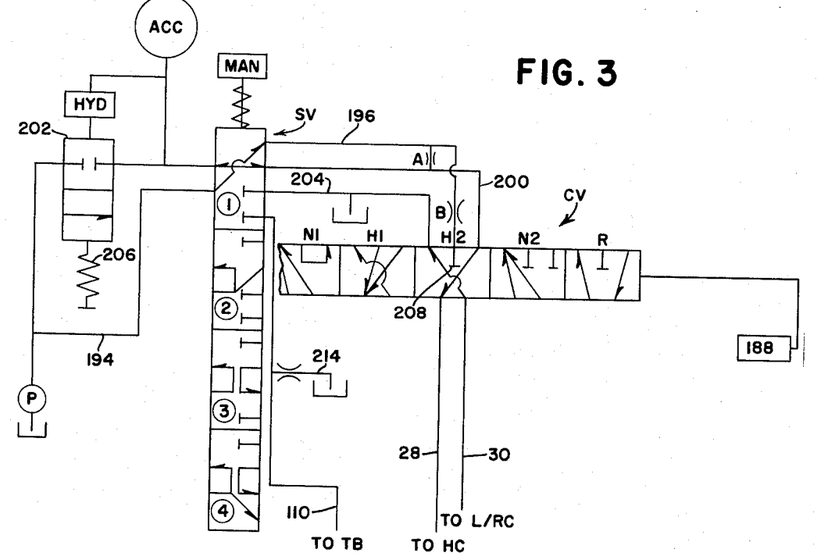
FIG. 3 is a similar view but shows the control valve shifted to the other of its high-range positions.
Figure 4:
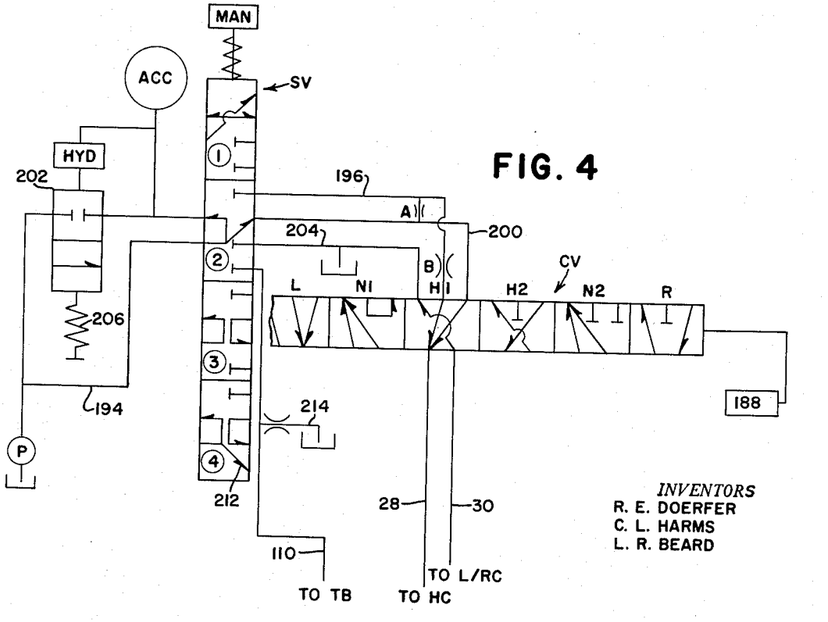
FIG. 4 is a view similar to FIG. 2 but shows the selector valve shifted to a second one of its several positions.

Let it be assumed that the control lever 144, in the position shown in FIGS. 6 and 7, is shifted laterally into the 2–R–5 notch 180 and is then moved rearwardly to the $H_1$ position, in which case the control valve CV is shifted to its $H_1$ position by the linkage 160—186—188. As previously described, the lost-motion device 162 assures that no change will be made in the shift collar 58. As will be seen in FIG. 2, the line 28 to the clutch HC is now connected to both the accumulator and pressure lines 200 and 196, and the line 30 is connected across the valve CV to the reservoir line 204. Consequently, the low clutch L/RC is disengaged and the high clutch HC is supplied by fluid from both the pump and the accumulator, the accumulator now having been charged and the accumulator valve 202 shifting downwardly to the position shown in FIG. 2, in which position it compresses its spring 206. Thus, both the accumulator and the pump are connected to the clutch HC so as to assure rapid filling thereof, after which pump pressure applied fully engages the clutch to achieve what may be regarded as "fast" engagement. The fast position ($H_1$) is in the forward-forward range (L—$N_1$—$H_1$) which is consistent with the rapid torque transition required in this range, as distinguished from the "slow" engagement of the clutch HC when the control valve is shifted to its forward-reverse range. The distinction may be readily observed by noting the difference between the passages in the valve in the $H_1$ and $H_2$ positions. In the former, as already described, both lines 196 and 200 are connected to the high clutch line 28. In position $H_2$, only the line 200 is connected directly to the line 28, as best seen in FIG. 3. This arrangement enables the utilization of "slow" engagement of the clutch HC in the forward-reverse range, which again is consistent with the range change because of the change in directions of travel of the vehicle in which the transmission is employed.

Noteworthy in the circuit is the presence of two orifices A and B. The orifice A is the smaller of the two and is arranged in a line that cross connects the lines 196 and 200 ahead of the control valve CV. The larger orifice B is in the line 196 downstream of the orifice A. In position $H_1$ of the control valve CV (FIG. 2) the accumulator will discharge through the line 200 to the line 28 to assure rapid filling of the clutch HC. The supply of fluid from the pump via the line 196 across the selector valve SV can return through the line 200 to the accumulator without passing through the smaller orifice A, thus rapidly filling the accumulator and increasing the rate of pressure build-up on the clutch HC, assuring fast clutch engagement which, as stated above, is desired for forward-forward range operation. In contrast to this, note FIG. 3 in which the pump line 196 is blocked at the control valve (at 208), whereas the accumulator line 200 is connected to the line 28. Consequently, any fluid from the pump line 196 that is to return to the accumulator must do so through the smaller orifice A, thus delaying recharging of the accumulator and consequently delaying the build-up of pressure on clutch HC, whereupon the rate of engagement of the clutch HC is slower than when the control valve CV is in its $H_1$ position.

When the control valve CV is shifted to its low or "L" position, both lines 196 and 200 are connected to the line 30 for the clutch L/RC, and again fast engagement is assured, because the accumulator relationship as controlled by the orifices A and B is the same as before. Actually, the orifice B is a regulating orifice and is not required in a system employing the broad principles. Suffice it that the orifice A is or provides a greater restriction in the cross connection between the lines 196 and 200 than exists in the line 196 downstream of the orifice. Moreover, it will be noted that the orifice A could occupy several other positions so long as it affords the restricting function referred to.

Figure 1:
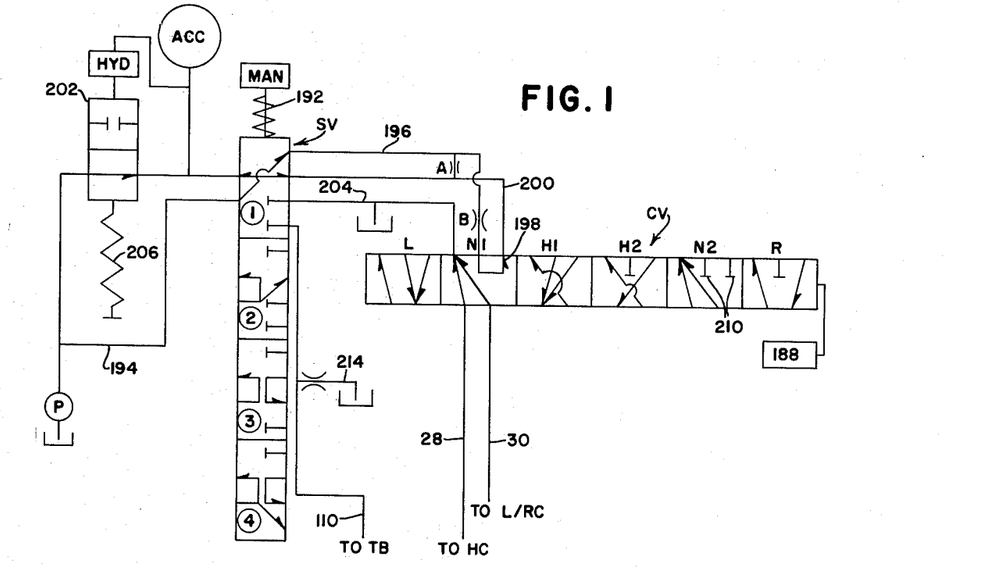
FIG. 1 is a schematic view of the hydraulic system involved, the main control valve being shown in neutral and the selector valve being in a first or normal position.
Figure 2:
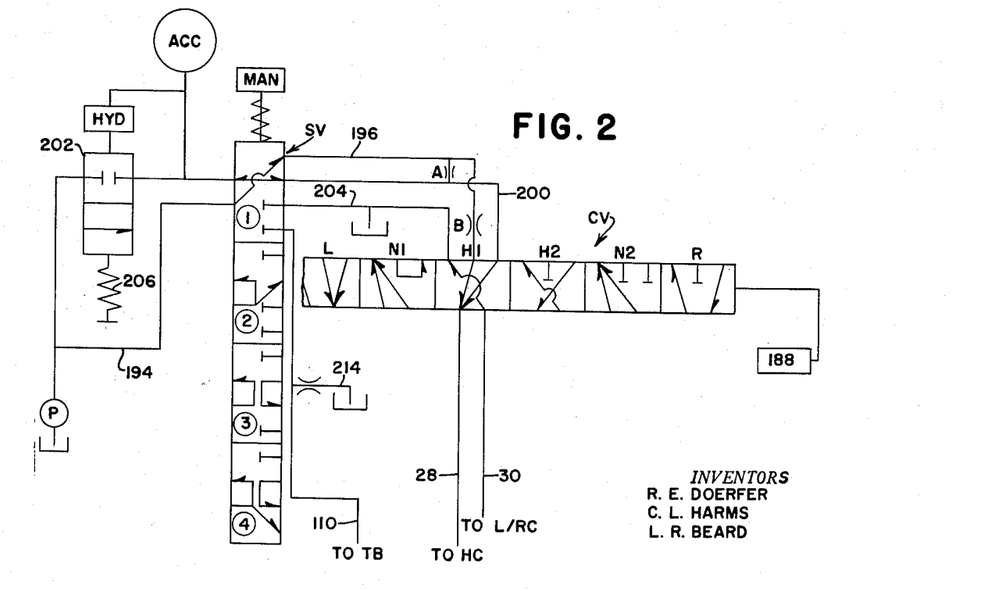
FIG. 2 is a similar view but showing the control valve shifted to one of its two high-range positions.

On the basis of the description thus far, it will be seen that the forward-forward range shift is accomplished with "fast" engagement of the clutches HC and L/RC. In forward-reverse range changes, the clutch engagement is delayed or is "slow" as compared with the fast engagement. Also, the valve CV in its neutral position corresponding to position $N_2$, is constructed so as to differ from its construction in the portion that is effective in the $N_1$ position. In both instances, both lines 28 and 30 are connected to the reservoir line 204, but in the $N_1$ position, the lines 196 and 200 are connected at 198, whereas in the $N_2$ position, the lines 196 and 200 end at the control valve, as represented at 210 (FIG. 1). In this case, the only way that fluid under pressure from the pump can reach the accumulator is via the orifice A and back across the selector valve SV, thus coordinating the neutral position with the "slow" engagement characteristics required in positions H₂ and R. In this respect, the valve in the portion thereof which is effective in the R position corresponds largely to the portion thereof that is effective in the H₂ position except, of course, opposite clutches are engaged and disengaged. Stated otherwise, the valve in both positions H₂ and R differs from the portions thereof in the L and H₁ positions in that in the L and H₁ positions, the clutch line 28 or 30 is connected to both the pressure and accumulator lines, whereas this is not true in the H₂ and R positions.

As previously described, the selector valve may be associated with a manual control apart from the lever 144. This typically may be a clutch pedal (not shown), but is here designated, as referred to above, by the rectangle labeled "MAN". One purpose of the selector valve and its several positions is to enable "slipping" of the engaged clutch, whether it be HC or L/RC, in conditions where "inching" or "creeping" is desired. In conditions of this nature, the selector valve may be alternated between positions two and three to secure the desired results. In both positions, it should be noted that the accumulator is in effect removed from the circuit. A change in position of the selector valve may be utilized in conjunction with a change in position of the lever 144, or the position of the selector valve may be changed after the lever 144 has selected one of the control valve positions. For example, if the selector lever 144 has previously selected the H₁ position (FIG. 4) and ultimately the selector valve is moved to position No. 2, the effect is to remove the accumulator from the circuit, during which time it will not become discharged. However, neither will the clutch HC become disengaged; and the clutch L/RC remains connected to the reservoir line 204. However, if the selector valve SV is moved to position No. 3, then the lines 200 and 204 are interconnected, meaning that the clutch HC is connected to reservoir. The pump line 194 is connected directly to the accumulator as it was in position No. 2. By alternating the selector valve between positions 2 and 3, the clutch HC may be engaged and disengaged or "slipped", thus affording the operator substantially the type of "feel" that he would obtain in a direct mechanically operated clutch. The same result is obtained with the control valve in any of its other active positions, such as L, H₂ and R.

Position No. 4 of the selector valve may be regarded as the transmission brake position. The valve in this portion substantially duplicates that of FIG. 3, in that it effects disengagement of the associated clutch, but at the same time it contains a passage 212 which connects the pump line 194 across the selector valve in position No. 4 to the transmission brake line 110. This type of disengagement may be desired in shifting from the forward-forward range to the forward-reverse range.

As regards the fluid pressure system itself, it may be considered as employing the pump, the reservoir, the accumulator and the first and second motor means as represented by the two clutches HC and L/RC, together with the control valve CV which is selectively settable in a neutral position (N₁) and either of two active positions H₂ and L. So regarded, the restriction A is effective in the H₂ position but not in the L position. In the present case, the basic system as outlined has been subjected to considerable refinements in the six-position valve because of the complexities introduced by the two clutches and the "fast" and "slow" engagement characteristics thereof. Moreover, the selector valve is refined to the extent that it has the four positions, outlined above. As will be seen, in each of the first three positions, the transmission brake line 110 is connected to reservoir at 214.

The operation of the transmission and the controls therefor has been set forth above in connection with the description and need not be elaborated. Suffice it to note that the coordination of the controls enables the employment of relatively simple components in a transmission capable of producing twelve speeds, eight speeds forward and four in reverse.

Features in addition to those outlined will readily occur to those versed in the art, as will many modifications and alterations in the preferred embodiment disclosed, all of which may be achieved without departure from the spirit and scope of the invention.

What is claimed is:

1. A transmission, comprising: an input shaft; a coaxial tubular first driven shaft having a first pinion fixed thereon remote from the input shaft; a fourth shaft paralleling the first driven shaft; first gear means connected to the fourth shaft and in constant mesh with said pinion for establishing fourth shaft rotation at a certain speed and in a certain direction; a second driven shaft extending loosely through the first driven shaft from adjacent to the input shaft to a remote portion beyond said first pinion; a drive member fixed to said portion; second and third relatively rotatable pinions concentrically journaled relative to the second driven shaft and disposed respectively at axially opposite sides of said drive member; second gear means connected to the fourth shaft and in constant mesh with the second pinion for producing fourth shaft rotation in the aforesaid direction but at a different speed; third gear means constantly engaged between the fourth shaft and the third pinion for producing reverse rotation of the fourth shaft; changeable means operative selectively in a first condition to connect the drive member to the second pinion and in a second condition to connect the drive member to the third pinion; first and second friction clutch means respectively between the input shaft and the first and second driven shafts; actuating means for selectively incurring the first and second conditions of the changeable means; and clutch operating means for alternately engaging one clutch means while disengaging the other with the changeable means in its first condition to selectively produce two speeds in one direction in the fourth shaft via the first and second gear means or with said changeable means in its other condition to selectively produce two different directions of rotation in said fourth shaft via the first and third gear means.

2. The invention defined in claim 1, including: first and second closely axially spaced brake elements fixed respectively to the first and second driven shafts and disposed axially intermediate the first pinion and the changeable means; and brake means for simultaneously engaging both brake elements.

3. The invention defined in claim 2, including: means coordinating operation of the brake means and the clutch operating means for actuating the brake means when both clutch means are disengaged.

4. The invention defined in claim 1, including: a fifth shaft having first and second output gears journaled thereon and respectively in constant mesh with the first and second gear means; and connection means for selectively connecting either fifth shaft gear to the fifth shaft.

5. The invention defined in claim 1, including: a fifth shaft having a pair of output gears journaled thereon and respectively in constant mesh with the first and third gear means; and connection means for selectively connecting either fifth shaft gear to the fifth shaft.

6. The invention defined in claim 1, in which: the clutch operating means includes a member movable selectively in either of a pair of separate substantially duplicate ranges incident to alternate engagement of the two clutch means and a selector for transferring the member between said ranges; and the actuating means includes a force-transmitting connection to said member for selecting between the conditions of the changeable means when the member is transferred between its ranges, said connection including a lost-motion device effective in either condition of the changeable means to enable movement of the member in its corresponding range while retaining the selected condition of said changeable means.

7. The invention defined in claim 1, including: means interconnecting the clutch operating means and the actuating means and operative while both clutch means are disengaged to select between the conditions of the changeable means and operative further to enable retention of either selected condition of the changeable means during alternate engagement of the two clutch means.

8. A transmission, comprising: an input shaft; first and second separate driven shafts; first and second clutch means alternately engageable and disengageable between the input and driven shafts to drive either driven shaft while the other is idle; a fourth shaft; first drive mechanism constantly connected between the first driven shaft and the fourth shaft and including speed ratio means for producing rotation of the fourth shaft at a certain speed and in a certain direction; second drive mechanism initially disconnected between the second driven shaft and the fourth shaft and including speed ratio means for rotation of the fourth shaft at a different speed but in the same direction as aforesaid; third drive mechanism initially disconnected between the second driven shaft and the fourth shaft and including reversing means for rotation of the fourth shaft in a reverse direction; and changeable means operative in a first condition to connect the second drive mechanism so that alternate engagement of the first and second clutch means will drive the fourth shaft selectively in said certain direction at either of said different speeds via the first and second driven shaft and the first and second drive mechanisms, and operative in a second condition to connect the third drive mechanism so that said alternate engagement of the first and second clutch means will drive the fourth shaft selectively in said certain direction or in said reverse direction via the first and third drive mechanisms.

9. The invention defined in claim 8, including: first and second brake elements respectively on the first and second driven shafts; and brake means operative to simultaneously brake both elements.

10. The invention defined in claim 9, including: clutch operating means for simultaneously disengaging both clutch means; and means interconnecting the clutch operating means and the brake means for actuating the brake means when said clutch operating means incurs disengagement of both clutch means.

11. The invention defined in claim 8, including: clutch operating means for selectively incurring alternate engagement of the two clutch means; actuating means for optionally selecting the conditions of the changeable means; and single control means connected to the clutch operating means and to the actuating means for selecting either condition of the changeable means and for alternately engaging the two clutch means in either of said selected conditions of said changeable means.

12. The invention defined in claim 8, including: clutch operating means operative selectively in either of two separate and similar ranges for alternately engaging the two clutch means in either range; first selecting means for selecting between said ranges for operation of the clutch operating means; second selecting means for optionally selecting either condition of the changeable means; and means interconnecting the two selecting means for incurring selection between conditions of the changeable means in response to selection between ranges and for retaining the selected condition of the changeable means during operation of the clutch operating means in the selected range.

13. A transmission, comprising: an input shaft; first and second separate driven shafts; first and second clutch means alternately engageable and disengageable between the input and driven shafts to drive either driven shaft while the other is idle; a fourth shaft; first drive mechanism constantly connected between the first driven shaft and the fourth shaft for producing a first speed condition in the fourth shaft; second drive mechanism initially disconnected between the second driven shaft and the fourth shaft and connectible to produce a second speed condition of the fourth shaft; third drive mechanism initially disconnected between the second driven shaft and the fourth shaft and connectible to produce a third speed condition of the fourth shaft; and changeable means operative in a first status to connect the second drive mechanism so that alternate engagement of the first and second clutch means will drive the fourth shaft selectively in said first and second speed conditions via the first and second driven shafts and the first and second drive mechanisms, and operative in a second status to connect the third drive mechanism so that said alternate engagement of the first and second clutch means will drive the fourth shaft selectively in said first and third speed conditions via the first and third drive mechanisms.

14. The invention defined in claim 13, including: clutch operating means for selectively incurring alternate engagement of the two clutch means; actuating means for optionally selecting either status of the changeable means; and single control means connected to the clutch operating means and to the actuating means for selecting either status of the changeable means and for alternately engaging the two clutch means in either selected status of said changeable means.

15. The invention defined in claim 13 including: clutch operating means operative selectively in either of two separate and similar ranges for alternately engaging the two clutch means in either range; first selecting means for selecting between said ranges for operation of the clutch operating means; second selecting means for optionally selecting either status of the changeable means; and means interconnecting the two selecting means for incurring selection between one status and the other of the changeable means in response to selection between ranges and for retaining the selected status of the changeable means during operation of the clutch operating means in the selected range.

16. A transmission, comprising: an input shaft; first and second separate driven shafts; first and second clutches for alternately connecting the driven shafts to the input shaft; a fourth shaft; first drive means constantly connected between the first driven shaft and the fourth shaft to produce a first speed condition in said fourth shaft; selectively connectible and disconnectible second drive means between the second driven shaft and the fourth shaft to produce a second speed condition in the fourth shaft; selectively connectible and disconnectible third drive means between the second driven shaft and the fourth shaft to produce a third speed condition in said fourth shaft; a shift element operative in first and second conditions to connect the second driven shaft optionally to the second and third drive means whereby alternate engagement of the two clutch means with the shift element in its first condition will alternately produce said first and second speed conditions in the fourth shaft and alternate engagement of the two clutch means with the shift element in its second condition will alternately produce said first and third conditions in said fourth shaft; and control means for the clutch means and the shift element, including a member movable back and forth selectively in either of two separate similar ranges incident to alternate engagement of the two clutch means and transferable from one range to the other, over-center means connected to the shift element and operative respectively at opposite sides of a central position to incur the two conditions of said element, and means interconnecting the over-center means and member for tripping said over-center means to opposite sides of said central position responsive respectively to transfer and re-transfer of said member between ranges, said interconnecting means including a lost-motion device effective to insulate the over-center means from the effects of movement of the member in either range.

17. A transmission, comprising: an input shaft; a first driven shaft having a first pinion fixed thereon; a fourth shaft; first gear means connected to the fourth shaft and in constant mesh with said pinion for establishing fourth shaft rotation at a certain speed and in a certain direction; a second driven shaft; a drive member fixed to said second driven shaft; second and third relatively rotatable pinions journaled relative to the second driven shaft and disposed respectively at opposite sides of said drive member; second gear means connected to the fourth shaft and in constant mesh with the second pinion for producing fourth shaft rotation in the aforesaid direction but at a different speed; third gear means connected to the fourth shaft and in constant mesh with the third pinion for producing reverse rotation of the fourth shaft; changeable means operative selectively in a first condition to connect the drive member to the second pinion and in a second condition to connect the drive member to the third pinion; first and second friction clutch means respectively between the input shaft and the first and second driven shafts; actuating means for selectively incurring the first and second conditions of the changeable means; and clutch operating means for alternately engaging one clutch means while disengaging the other with the changeable means in its first condition to selectively produce two speeds in one direction in the fourth shaft via the first and second gear means or with said changeable means in its other condition to selectively produce two different directions of rotation in said fourth shaft via the first and third gear means.

18. A transmission, comprising: a power source; first, second and third separate driven shafts; first drive means constantly effective between the first and third shafts to produce a first speed condition in said third shaft; second drive means selectively connectible and disconnectible between the second and third shafts to produce a second speed condition in said third shaft; third drive means selectively connectible and disconnectible between the second and third shafts to produce a third speed condition in said third shaft; changeable means operative alternately between the second and third drive means to connect one while disconnecting the other; first friction clutch means selectively engageable and disengageable between the power source and first shaft; second friction clutch means selectively engageable and disengageable between the power source and the second shaft; and control means for alternately engaging the two clutch means while the changeable means connects either the second and third drive means whereby to selectively alternate the third shaft between its first and second speed condition or its first and third speed condition.

19. The invention defined in claim 18, in which: one of the drive means includes reversing mechanism for driving the third shaft reversely in the respective speed condition.

20. The invention defined in claim 18, in which: the two clutch means are friction clutches, and the second and third drive means respectively include toothed clutch elements, and the changeable means includes a toothed element shiftable back and forth selectively into and out of engagement with the second and third drive means toothed elements.

References Cited in the file of this patent
UNITED STATES PATENTS

| | | |
|---|---|---|
| 2,633,754 | Gerst | Apr. 7, 1953 |
| 2,654,261 | Youngren et al. | Oct. 6, 1953 |
| 2,728,243 | Winther | Dec. 27, 1955 |